2,987,774
METHOD FOR PRODUCING POROUS BODIES OF THERMOPLASTIC MATERIALS

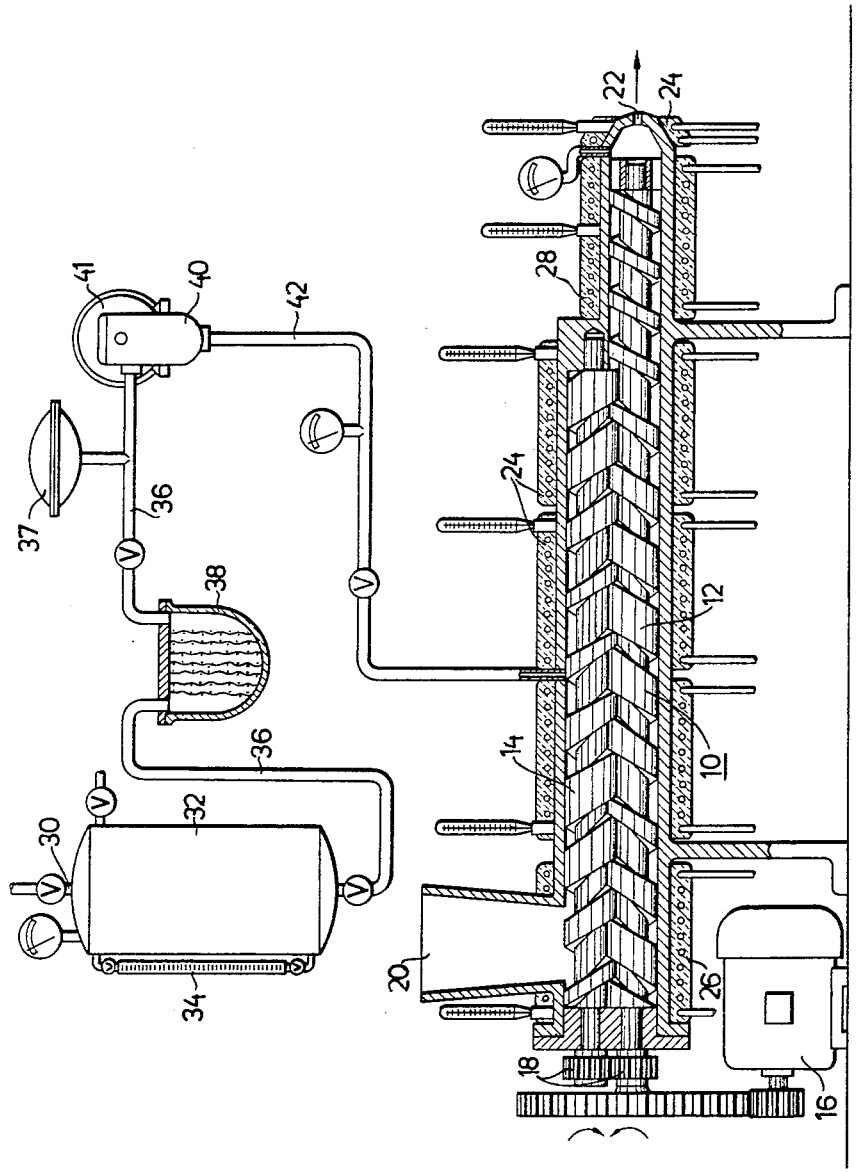

Ulf Carl Henrik Jacobson, Sundsvall, Sweden, assignor to Isoleringsaktiebolaget W.M.B., Gothenberg, Sweden, a joint-stock company of Sweden
Original application July 16, 1953, Ser. No. 368,254. Divided and this application Mar. 13, 1958, Ser. No. 722,114
1 Claim. (Cl. 18—48)

My invention relates to a method for producing porous bodies of thermoplastic organic materials by means of a foam producing or solvent agent intermixed with or dissolved in said material while subjected to pressure and heat. When the material such as polystyrene, for example, then escapes through a nozzle, the medium will expand so as to impart to the body the desired porous structure. In the prior art a quantity of the thermoplastic material was introduced into a container together with a solvent such as methyl chloride, for example, which at room temperature is in a gaseous state. The contents of the container is heated to a temperature at which the thermoplastic material becomes liquid or semiliquid. After a diffusion process of at least one day's duration the contents of the container are caused to leave the container, the thermoplastic material during this escape foaming up, due to the release of pressure, and becoming porous and finally hardening in this porous form.

This application is a division of my co-pending application Serial No. 368,254, filed July 16, 1953 and now abandoned.

One object of my invention is to provide a method which differs from the method and containers known to the prior art and which makes possible the continuous production of porous bodies or foamed plastics.

A further object of my invention is to provide a method permitting intimate intermixture of the plastic and the agent during a fraction only of the time required by the prior art.

Further objects and advantages of the invention will be apparent from the following description considered in connection with the accompanying drawing, which forms a part of this specification.

Referring to the drawing, 10 designates generally a multiscrew pump having two rotary screws engaging one another, the longer screw 12 being driven by a motor 16 and in turn through gears 18 driving the shorter screw 14. The screws are over the length of the length of the latter screw in a manner known per se subdivided into preferably three sections. Said sections differ in shape inasmuch as in the first section the spaces between the threads of the screw 14 progressively decrease in magnitude in the working direction and increase between the threads of the screw 12. In the adjacent section the relations are reversed, the spaces increasing between the threads of the screw 12 and decreasing between those of the screw 14. In the third section the threads are formed in the same manner as those of the first section. Due to this feature the plastic mass introduced into the screw pump is subjected to a highly effective mechanical treatment resembling that to which material is subjected in rolling mills, the mass at the same time being conveyed from the one screw to the other. Between the threads is a gap decreasing in each section in the working direction so as to have the threads to seal against one another and the pump housing at the end of each section. The pulverulent or pasty mass of thermoplastic material introduced through a hopper 20 or the like is fed toward the outlet 22 while at the same time being displaced in transverse direction between the double-screw sections and the freely projecting prolongation of the longer screw 12. Said prolongation has a suitable steep pitch. The outlet 22 is shaped as an injection nozzle either forming a narrow slit adapted for the manufacture of plates or constituted by small holes adapted to give a final product of granular shape. For covering cables with foamed plastic the nozzle has annular shape in a manner known per se.

The pump housing is suitably surrounded by a plurality of casings 24 to which heat is transferred by electricity or most preferably by steam. The casing 26 at the inlet side of the pump may be cooled. The casing 28 surrounding the prolongation of the screw 12 may be connectable to both a heat source and a cold source for alternatingly being heated and cooled. The casings 24 may also be devised connectable to a source of cold.

Solvent such as methyl chloride, for example, is fed in liquid state from a large storage tank through a conduit 30 into a container 32 which for control of its contents may communicate with a scaled glass tube 34. The liquid methyl chloride which may be at a pressure of about 4 atmospheres is through a conduit 36, which may include a filter device 38, supplied to the intake side of a high-pressure piston pump 40 driven by a continuously variable electric motor 41. The pump 40 is preferably of a type similar to that used, for example, for injection of fuel into diesel engines as it runs at high speed and with each stroke feeds a little quantity of solvent to the screw pump 10. The methyl chloride is introduced into the screw pump through a conduit 42 preferably approximately at the middle of the shorter screw 14 or into the second section defined above of the multi-screw pump. In some cases it is, however, preferred to introduce the solvent at the end of the first section. In the conduit 42 the solvent is under a pressure between 15 to 20 and 40 to 50 atmospheres.

In order to impart to the foamed plastic the desired porosity, which means pore volume and thickness of the walls of the pores, it is of greatest importance in connection with the continuous feeding of the thermoplastic material that the solvent is added in amounts of exact magnitude. The high-pressure pump, of course, operates intermittently, but due to its high number of strokes it ensures an almost continuous supply of solvent to the thermoplastic material. The high-pressure pump permits by change in the number of revolutions of the electric motor an exact adjustment of the supplied quantity of solvent.

It has proved to be more advantageous to adjust the supplied quantity of solvent by adjusting the motor 41 than by adjusting the effective length of stroke as is convenient with fuel pumps. In the conduit 36 pressure shocks are caused by the reciprocating movement of the piston. In connection with the volatile substances used in accordance with the invention said pressure shocks are capable of creating in the conduit pads of gas setting the pump out of operation. In order to counteract said pressure shocks the conduit 36 includes a pressure equilibrator 37 suitably in the shape of a membrane. When adjusting the quantity of supplied solvent by adjusting the length of stroke the pressure shocks become so high, in particular when the supply is reduced, as to make a pressure equilibrator of the type set forth insufficient for its purpose.

By constructing the screw pump 10 as described above a complete sealing in the threads is obtained due to the high viscosity of the plastic material which simultaneously is subjected to an effective mechanical agitation. Said plastic material is changed into liquid or semiliquid state due partly to the friction against the screws and the pump housing and partly to the supply of heat from outside via the casings 24. The solvent is intimately intermixed with the thermoplastic material so as to be dissolved and homogeneously dispersed therein. If the thermoplastic material is constituted by polystyrene, the temperature in the first stage of melting must be relatively high, amounting to about 180° C. to be lowered upon intermixture of the methyl chloride to about 90° C. When using polyvinyl chloride, mixed polymerizates or polyethylene as starting material, the temperature may during the whole working procedure be kept almost constant at about 90° C. When the mass finally passes through the single-screw section and escapes through the nozzle 22 the solvent expands so as to cause the mass to foam up and to get the desired porosity.

The solvent or foam-producing agent is chosen with regard to the thermoplastic material to be treated. In most cases methylchloride appears to be suited, for example when treating polyvinyl chloride, mixed polymerizates, polystyrene etc. For the treatment of polyethylene constituting the plastic with the optimum electrical properties, a hydrocarbon with at least four straight carbon chains, such as butane or mixtures therewith, for example, ought to be employed. For the treatment of cellulose acetate I prefer to use acetone.

Under the intermixture of the thermoplastic mass and the solvent or foam-producing agent, this latter undergoes a reduction of vapor pressure. Consequently by suitably adjusting the agent and the thermoplastic material it is possible to obtain a mixture having at room temperature or a moderate temperature surpassing room temperature a relatively low vapor pressure in spite of the fact that the agent proper has a very high vapor pressure at the same temperatures.

In the manufacture of rigid foamed plastics a relatively soft and easily soluble starting material such as polyvinyl chloride mixed polymerizates, for example, is chosen in order to make possible mechanical working of the thermoplastic material in the screw pump and intermixing thereof with the solvent without adding any plasticizers. The manufacture of soft elastic products having similar properties as sponge or foamed rubber, starts from a very hard plastic material such as pure polyvinyl chloride, for example, to which a plasticizer such as tricresyl phosphate, for example, is added. Pure polyvinyl chloride remains even at elevated temperatures and under high pressure unaffected by convenient solvents and foam-producing agents, but when effectively worked mechanically and subjected to high temperature it gelatinizes with the plasticizer and into the gel thus obtained solvents such as methyl chloride, for example, can be mixed. A non-rigid plastic is, on the contrary, not suitable in itself to be employed together with plasticizers, because the foamed-up product would collapse immediately.

In the cable-manufacturing industry polyethylene and polystyrene are the materials coming first into consideration. They are treated in the same manner as in the manufacture of hard products of foamed plastic, but they are caused to pass through a nozzle of similar type as that used in coating cables with compact thermoplastics.

Foamed plastics in granular form are highly electrostatic which results, among other things, in difficulties in the manipulation of such materials. This inconvenience may be eliminated by introducing inorganic substances, particularly metal powders such as aluminum powder, in quantities up to 30 and 40% by weight into the pulverulent body of plastic material prior to its supply to the screw pump.

While one more or less specific embodiment of the invention has been shown, it is to be understood that this is for the purpose of illustration only, and the invention is not to be limited thereby, but its scope is to be determined by the appended claim.

What I claim is:

The method of continuously producing a uniformly controlled porous plastic material which comprises supplying plastic material in solid form to one end of a multiple screw pump defining a confined single, continuous path of progress for the plastic material having an inlet at said one end and a restricted outlet downstream of said one end and in which the threads of adjacent screws engage one another and alternately opposite sides of the walls of said path whereby to form sealed spaces in staggered fashion at opposite sides of the wall, said path comprising a plurality of serially arranged contiguous zones through which the material is being continuously moved and successively moved subject to continuing pressure of said screw pump, the first zone being a feed-in zone in which a material is moved in zig-zag fashion from space to space continuously between said threads while at the same time progressing longitudinally to thereby agitate the material while being heated to change it to gelatinous form and constantly subject to pressure created in said pump, a second zone immediately downstream of said first zone and in which the gelatinized material is admixed with a measured quantity of liquid comprising a normally gaseous solvent at super-atmospheric controlled pressure and in a constantly controlled amount so as to maintain the material in gelatinous form while continuously progressing longitudinally and being agitated, and a third zone immediately downstream of said second zone and in which the material while still progressing and being agitated is cooled while still in the pump to reduce its pressure to such a degree that it will upon being extruded from said restricted outlet expand into a uniform porous mass.

References Cited in the file of this patent

UNITED STATES PATENTS

| | | |
|---|---|---|
| Re. 23,948 | Fuller | Feb. 15, 1955 |
| 2,515,250 | McIntire | July 18, 1950 |
| 2,669,751 | McCurdy et al. | Feb. 23, 1954 |

FOREIGN PATENTS

| | | |
|---|---|---|
| 1,011,179 | France | Apr. 2, 1952 |
| 879,861 | Germany | June 15, 1952 |